United States Patent
Doyle et al.

(10) Patent No.: US 9,471,341 B1
(45) Date of Patent: Oct. 18, 2016

(54) OPTIMIZING LATEST USER DEFINED CLASS LOADER

(71) Applicant: International Business Machines Corporation, Armonk, NY (US)

(72) Inventors: Patrick R. Doyle, Toronto (CA); Prashanth S. Krishna, Bangalore (IN); Sathiskumar Palaniappan, Namakkal (IN); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,934

(22) Filed: Dec. 11, 2015

(51) Int. Cl.
 *G06F 9/45* (2006.01)
 *G06F 9/44* (2006.01)
 *G06F 9/445* (2006.01)

(52) U.S. Cl.
 CPC ........... *G06F 9/44521* (2013.01); *G06F 8/443* (2013.01)

(58) Field of Classification Search
 USPC ......................................................... 717/151
 See application file for complete search history.

(56) References Cited

U.S. PATENT DOCUMENTS

| | | | | |
|---|---|---|---|---|
| 6,405,264 | B1* | 6/2002 | Jindal | G06F 9/542 719/315 |
| 6,915,511 | B2* | 7/2005 | Susarla | G06F 9/445 717/148 |
| 6,986,143 | B2* | 1/2006 | Cole | G06F 9/548 707/999.103 |
| 8,276,125 | B2 | 9/2012 | Fan et al. | |
| 8,661,426 | B2* | 2/2014 | Chapman | G06F 9/44521 717/162 |
| 8,745,643 | B2* | 6/2014 | Kabanov | G06F 9/443 719/332 |
| 2002/0052984 | A1* | 5/2002 | Jindal | G06F 9/465 719/330 |
| 2003/0018962 | A1* | 1/2003 | White | G06F 9/445 717/166 |
| 2003/0056023 | A1* | 3/2003 | Cole | G06F 9/548 719/315 |
| 2006/0271922 | A1* | 11/2006 | Chan | G06F 9/445 717/166 |
| 2008/0127157 | A1* | 5/2008 | Burns | G06F 9/445 717/166 |
| 2008/0282266 | A1* | 11/2008 | Kabanov | G06F 9/443 719/320 |
| 2012/0174084 | A1* | 7/2012 | Chapman | G06F 9/44521 717/166 |
| 2012/0324433 | A1* | 12/2012 | Kabanov | G06F 9/443 717/166 |
| 2014/0325492 | A1 | 10/2014 | Stoodley et al. | |

OTHER PUBLICATIONS

"Java Object Serialization Specification", Copyright © 2005, 2010, Oracle and/or its affiliates. Retrieved from <https://docs.oracle.com/javase/7/docs/platform/serialization/spec/serialTOC.html> total pp. 24.*

(Continued)

*Primary Examiner* — Marina Lee
(74) *Attorney, Agent, or Firm* — Kamyar Maserrat; Michael A. Petrocelli

(57) ABSTRACT

A computer-implemented method for class load optimizing. The method identifies a class in which a context can be determined at a compile time, using a compiler. The method determines whether a caller method within the class has a specific signature call using the context of the class. The method determines a callee method within the class using the context of the class. The method determines whether the callee method's receiver is a first argument of the caller method. Furthermore, the method retrieves a class object of the class and converts the callee method to a second method, in response to the caller method having the specific signature, the callee method being of the specific signature and callee method being the first argument of the caller method.

20 Claims, 5 Drawing Sheets

(56) References Cited

OTHER PUBLICATIONS

Disclosed Anonymously, "Method and apparatus for optimized serialization and deserialization of objects in virtualized environments", IP.com Prior Art Database Technical Disclosure, IP.com No. 000219074, Publication Date: Jun. 19, 2012, pp. 1-13.

Oracle®, "System Architecture", Java Object Serialization Specification Version 6.0, http://docs.oracle.com/javase/7/docs/platform/serialization/spec/serial-arch.html, printed on May 15, 2015, pp. 1-10.

Object Management Group, "Java to IDL Language Mapping, Version 1.4", OMG Available Specification, Document Number: formalJan. 14, 2008, Date: Jan. 2008, pp. 1-68, http://www.omg.org/spec/JAV2I/1.4/PDF.

Oracle®, "Class Util", Java™ Platform Standard Ed. 7, https://docs.oracle.com/javase/7/docs/api/javax/rmi/CORBA/Util.html, printed on May 15, 2015, pp. 1-7.

Grace Period Disclosure: IBM, "IBM SDK, Java Technology Edition, Version 8," IBM SDK Support Information, Last Modified Aug. 19, 2015, pp. 1-4, http://www-01.ibm.com/support/docview.wss?uid=swg21696670, printed on Nov. 6, 2015.

Grace Period Disclosure: IBM, "IBM developer kits lifecycle dates", printed on Dec. 8, 2015, pp. 1-2, http://www.ibm.com/developerworks/java/jdk/lifecycle/.

Chaum, "Security Without Identification: Transaction Systems to Make Big Brother Obsolete", Communications of the ACM, vol. 28, No. 10, Oct. 1985, pp. 1030-1044.

\* cited by examiner

```
306
        class C {
              void readObject(ObjectInputStream arg) {
304           ...
              x = arg.readObject();
              ...
        }
}
                        308
```

```
Example
class A implements java.io.Serializable { double d =100.5d;
  transient int k = 200;
  transient java.util.Map obj = new java.util.HashMap();

private void writeObject((java.io.ObjectInputStream s) throws java.io.IOException {
      s.defaultWriteObject();

int size = obj.size();
      s.writeInt(size);
      if (size > 0) {
        for(Map.Entry e : obj.entrySet()) {
            s.writeObject(e.getKey());
            s.writeObject(e.getValue());
        }
      }
  } private void readObject(java.io.ObjectInputStream s) throws java.io.IOException, ClassNotFoundException {
      d = s.defaultReadObject();         // Line 1
      for (int i = 0; i < mappings; i++) { // Line 2
         Object key = s.readObject();     // Line 3
         Object value = s.readObject();   // Line 4
      }
  }
}
```
310 / 302

FIG. 3

OPTIMIZING LATEST USER DEFINED CLASS LOADER

Aspects of the present disclosure have been disclosed by International Business Machines Corporation (hereafter known as IBM or the Applicant) in the product IBM SDK, Java Technology General Announcement, made available to the public on Jan. 30, 2015.

BACKGROUND

The present disclosure relates generally to the field of computer systems for optimizing the latest a user-defined class loader.

A typical enterprise Java application generally has a server servicing many clients. A banking application is a good example to illustrate the fact that a server can have hundreds of clients connecting to it. A customer, considered a client application here, will make transactions on his/her account. These transactions require data to be exchanged between the client and server.

Distributed computing in JAVA makes use of either RMI-JRMP or RMI-IIOP technologies. Java Remote Method Protocol or JRMP is a Java-specific, stream-based protocol for Java-to-Java remote calls, requiring both clients and server to use Java objects. On the other hand, RMI-IIOP denotes the Java Remote Method Invocation (RMI) interface over the Internet Inter-Orb Protocol (IIOP), which delivers Common Object Request Broker Architecture (CORBA) distributed computing capabilities to the Java platform. CORBA is a standard defined by the Object Management Group (OMG) designed to facilitate the communication of systems that are deployed on diverse platforms. With features inherited from CORBA, software components that work together can be written in different languages (for example, C++ and Java). Both RMI-JRMP and RMI-IIOP leverage JAVA serialization to communicate (transfer parameters) between components. A Java object is serializable if its class or any of its superclasses implements either the java.io.Serializable interface or its sub interface, java.io.Externalizable.

Marshaling (involves serialization) is a process of decomposing an instantiated object into a data format that may be transferred via a message. Un-marshaling, is a process of reconstructing an instantiated object at a receiving device in response to receipt of a message including an object formatted as serialized/marshaled data. During an un-marshaling (involves de-serialization), a new instance of an object is created from a serialized data object, such as a serialized data object received within a message. As such, at least one corresponding class associated with the object has to be loaded if not already loaded. Certain of the non-limiting examples described herein refer to the CORBA architecture and specification. The CORBA specification typically mandates that the class loading, at first, should be attempted using the Latest User Defined Class Loader (hereafter abbreviated as LUDCL).

Obtaining the LUDCL for a particular thread is performed by invocation of certain virtual machine application programming interfaces (APIs) and this occurs during every de-serialization of a CORBA message. Using an example of several enterprise applications, extensive CPU time is spent in the JVM/JIT procedures that assist in thread stack walk to identify the LUDCL.

LUDCL is typically needed to be computed for every object that is unmarshalled. In the existing ORB implementation the computed LUDCL is cached and reused to unmarshal the entire object graph (Various fields of the object) to save the cost provided the object is non-custom marshal. There are scenarios (Custom Marshal Scenarios) in de-marshalling where the program execution goes out of the JDK/CORBA source code into the application code and returns to the JDK/CORBA source code. When the control goes to the application, the application is free to invoke any method (and hence create a stack frame on the current thread stack) whose class is loaded by a different user-defined class loader. This changes the LUDCL and hence one cannot use the cached one in the case of Custom marshal payload scenarios. Such a transition between user-defined class loaders occur with or without intervening bootstrap loader method invocations. This demands the LUDCL to be computed for each object that are unmarshalled in the given object graph.

SUMMARY

The present disclosure implements a system, method, and computer program product for optimizing a user-defined class. In an embodiment, the method identifies a class in which a context can be determined at a compile time, using a compiler. The method determines whether a caller method within the class has a specific signature call using the context of the class. The method determines a callee method within the class using the context of the class. The method determines whether the callee method's receiver is a first argument of the caller method. Furthermore, the method retrieves a class object of the class and converts the callee method to a second method, in response to the caller method having the specific signature, the callee method being of the specific signature and callee method being the first argument of the caller method.

In another embodiment a computer program product for class loader optimizing is provided the computer program product includes identifying a class in which a context can be determined at a compile time, using a compiler. The computer program product includes determining whether a caller method within the class has a specific signature call using the context of the class. The computer program product includes determining a callee method within the class using the context of the class. The computer program product includes determining whether the callee method's receiver is a first argument of the caller method; and The computer program product includes retrieving a class object of the class and converting the callee method to a second method, in response to the caller method having the specific signature, the callee method being of the specific signature and callee method being the first argument of the caller method.

In another embodiment a computer system for class loader optimizing is provided the computer system includes identifying a class in which a context can be determined at a compile time, using a compiler. The computer system includes determining whether a caller method within the class has a specific signature call using the context of the class. The computer system includes determining a callee method within the class using the context of the class. The a computer system includes determining whether the callee method's receiver is a first argument of the caller method; and The a computer system includes retrieving a class object of the class and converting the callee method to a second method, in response to the caller method having the specific signature, the callee method being of the specific signature and callee method being the first argument of the caller method.

BRIEF DESCRIPTION OF THE SEVERAL VIEWS OF THE DRAWINGS

FIG. 3 is a schematic block diagram depicting code of a class, according to an embodiment of the present disclosure.

DETAILED DESCRIPTION

Figure 1A:
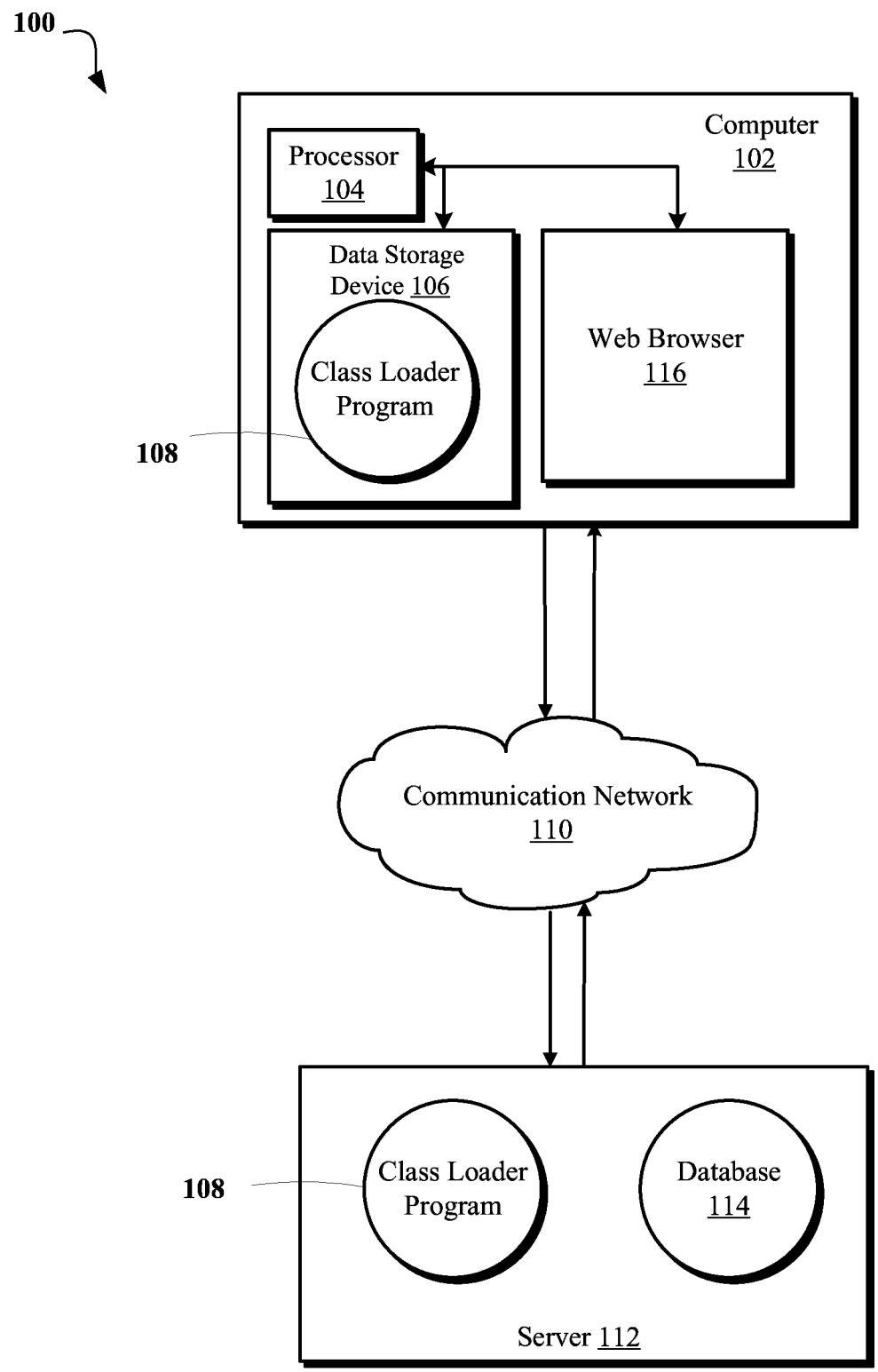
FIG. 1A is schematic block diagram depicting an exemplary computing environment for a class loader program, in accordance with an aspect of the present disclosure.

FIG. 1A depicts a computing environment 100 for managing the display of application forms within a web-based application. In various embodiments of the present disclosure, the computing environment 100 may include a computer 102 and server 112 connected over communication network 110.

A computer 102 may include a processor 104 and a data storage device 106 that is enabled to run a class loader program 108 and a web browser 116 that may display an application form or a user interface for the user to work a class loader program 108. Non-limiting examples of a web browser may include: Firefox®, Explorer®, or any other web browser. All brand names and/or trademarks used herein are the property of their respective owners.

The computing environment 100 may also include a server 112 with a database 114. The server 112 may be enabled to run a program such as a class loader program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as a class loader program 108 may run on the computer 102 or on the server 112. It should be appreciated that class loader program 108 has the same component and operation methods regardless of whether it is run on the server 112 or computer 102. Therefore class loader program 108 applies to both class loader program 108 run on a computer 102 and class loader program 108 run on the server 112 are interchangeably used throughout this disclosure.

Figure 1B:
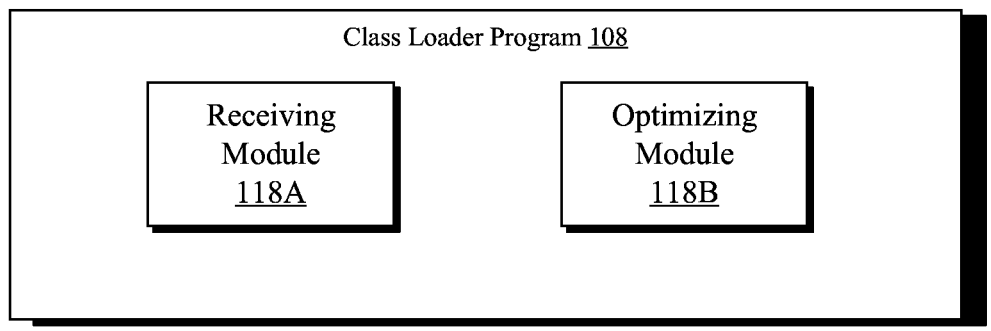
FIG. 1B is as schematic block diagram depicting components of a class loader program, in accordance with an aspect of the present disclosure.

Referring now to FIG. 1B, different modules of class loader program 108 are depicted. Class loader program 108 comprises two modules of receiving module 118A, and optimizing module 118B. According to an embodiment of the present disclosure, every time a code flow enters a custom deserialization code (in this embodiment: the readObject( ) method) to deserialize its member objects, the Just In Time compiler (JIT) will understand the context of the method call and pass the class object to the serialization engine. In other words, in the present embodiment, class loader program 108 using a compiler such as JIT compiler will transform the readObject( ) method call to a static rediectedReadObject( ) method call. The present embodiment defines the redirectedReadObject( ) method in the serialization system that takes in all of the original arguments (of readObject( ) and also an extra argument for the class of the method containing the call. As the class object (the context object) passed to class loader program 108, Class Loader (LUDCL) is retrieved easily without the expansive stack walk. In the Java programming language and environment, a just-in-time (JIT) compiler is a program that turns Java bytecode (a program that contains instructions that must be interpreted) into instructions that can be sent directly to the processor. Generally when a Java program is written, the source language statements are compiled by the Java compiler into bytecode rather than into code that contains instructions that match a particular hardware platform's processor (for example, an IBM System/390 processor). The bytecode is platform-independent code that can be sent to any platform and run on that platform. Some Java Virtual Machines include a JIT in addition to a Java interpreter. Java programs compiled by JIT generally run much faster than when the bytecode is executed by an interpreter.

Figure 2:
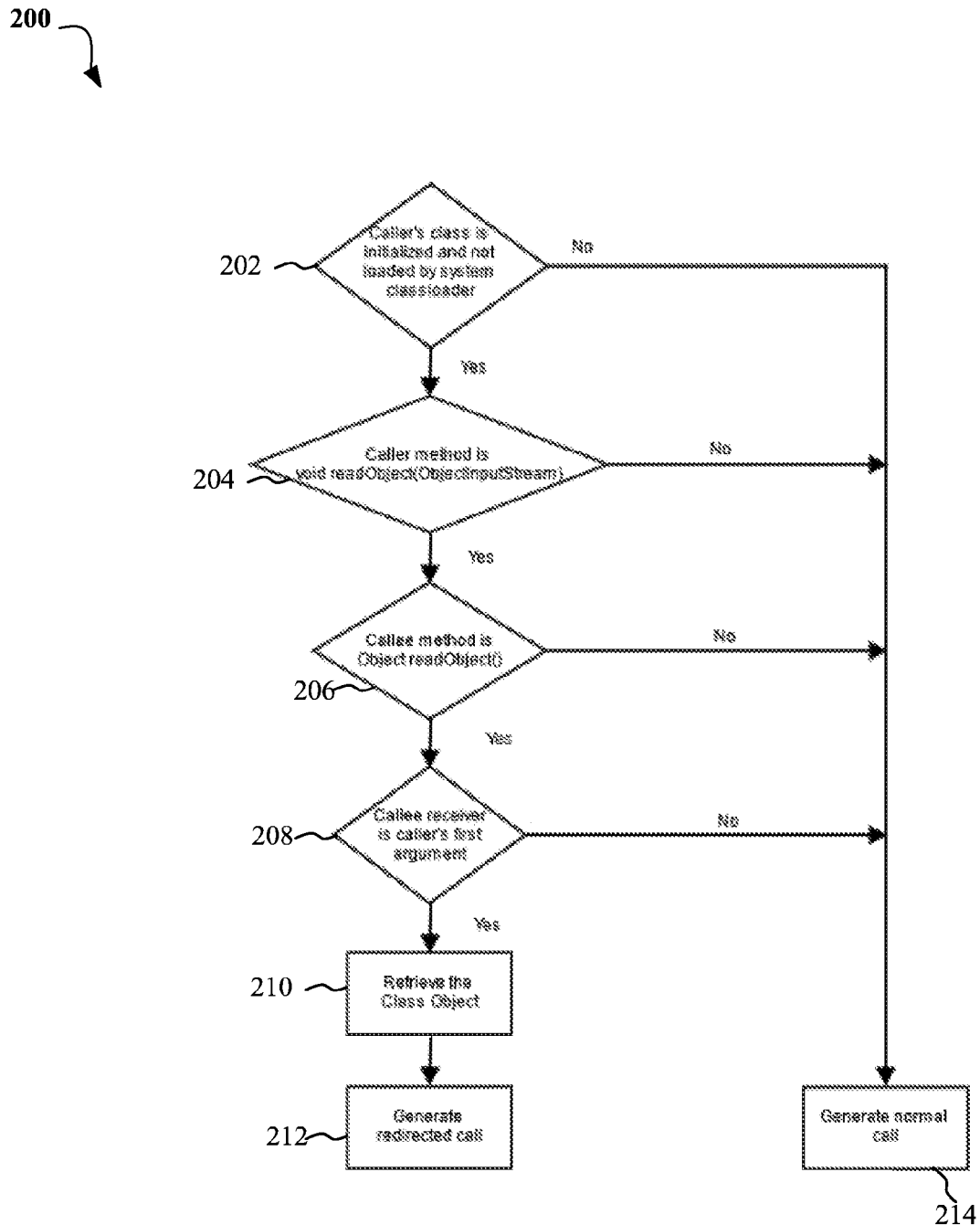
FIG. 2 is a flowchart depicting operational steps of a method for a class loader program, in accordance with an embodiment of the present disclosure.

FIG. 2 is a flowchart depicting operational steps of a method for a class loader program 108, in accordance with an embodiment of the present disclosure. In the present embodiment, a user defined class (class 304) is deserialized. In reference to FIG. 2, in conjunction with FIG. 3, steps of method 200 may be implemented using one or more modules of a computer program, for example, class loader program 108, and executed by a processor of a computer, such as computer 102. It should be appreciated that FIG. 2 does not imply any limitations with regard to the environments or embodiments which may be implemented. Many modifications to the depicted environment or embodiment shown in FIG. 2 may be made.

Receiving module 118A may receive one or more classes. Receiving module 118A may, in one embodiment, receive a set of code including multiple classes electronically by another electronic device. At 202, optimizing module 118B may identify a class in which a context can be determined at compile time. This simply refers to determining whether a class has a call method within its content. Compile time refers to the operations performed by a compiler. Furthermore, a compiler is a computer program (or a set of programs) that transforms source code written in a programming language (the source language) into another computer language. Optimizing module 118B may check whether the received class (i.e. the class of the object being deserialized) is not loaded by the System ClassLoader. Optimizing module 118B may also determine whether the class is initialized. System Class loaders are the null class loaders that are used to load the JDK classes. A non-limiting example for these classes is java.net.Socket. Initialization prepares classes and objects for use during a program's execution. Initialization, in one embodiment, may involve opening a file and reading its contents into a memory buffer, registering a database driver, preparing a memory buffer to hold an image's contents, or acquiring the resources necessary for playing a video. It must be appreciated that the present disclosure is applied mainly to computing the non-null class loader (non system class loader). In the present embodiment, optimizing module 118B receives class 304, and determines that class 304 is a non-null class due to the content of class 304.

At 204, the optimizing module 118B may determine whether a caller method of the identified class has a specific signature using the context of the class. Optimizing module 118B, in one embodiment, may determine whether the caller method's signature is void readObject(java.io ObjectInputStream), this is because any custom deserialization is packaged as part of the readObject( ) method. A call method (which is interchangeably used as the method or method) is a set of code which is referred to by name and can be called or invoked at any point in a program simply by utilizing the call method's name. In an embodiment, a call method may be thought of as a subprogram that acts on data and often returns a value. Each call method may have its own name. When a call method name is encountered in a program, the execution of the program branches to the body of that call method. When the call method is finished, execution returns to the area of the program code from which it was called, and the program continues on to the next line of code. Call methods, in an embodiment, may allow for the repetition of sections of code without retyping the code. In addition, methods may be saved and utilized again and again in newly developed programs. When a call method is called, a request is made to perform some action, such as setting a value, printing statements, returning an answer, etc. The code to invoke the method contains the name of the call method to be executed and any needed data that the receiving method requires. The required data for a method are specified in the method's parameter list. A callee method may be a method that gets invoked at a call inside another method's code by a caller method. For example in the following method:

int number=Console.readInt("Enter a number"); //returns a value

The call method name is "readInt" which is defined in the class "Console". Since the call method is defined in the class Console, the word Console becomes the calling object. This particular call method returns an integer value which is assigned to an integer variable named number. In an embodiment call is made by writing down the calling object followed by a dot, then the name of the method, and finally a set of parentheses that may (or may not) have information for the method. In the present embodiment, optimizing module 118B surveys class 304 and makes the determination that the callers' method signature is in fact void readobject. The determination is made due to the presence of code 306.

At 206, the optimizing module 118B, may determine a callee method within the class using the context of the class check. In an embodiment optimizing module 118B may determine whether the callee method is the same as the caller method. In another embodiment, optimizing module 118B may determine whether the callee method is readObject( ) In other words, optimizing module 118B checks for the following within the class (e.g. code within the class): x=arg.readObject( ). The method that contains the code calling the callee method is the caller method. Therefore it logically follows that a callee method may be a method that gets invoked at a call inside another method's code. In the present embodiment, optimizing module 118B determines that the callee method is readobject( ) due to code 308.

At 208, optimizing module 118B whether the readObject is called on the first argument of the caller. The terms parameter and argument are sometimes used interchangeably, and the context is used to distinguish the meaning. The term parameter is often used to refer to the variable as found in the function definition, while argument (sometimes called actual parameter) refers to the actual input passed. For example, if one defines a function as def f(x): . . . , then x is the parameter, while if it is called by a= . . . ; f(a) then "a" is the argument. In both cases a parameter is an (unbound) variable, while the argument can be thought of as a value or variable, depending on the calling. In case of call by value, one can think of the argument as a value (properly, as the value of the argument)—for example, f(2) and a=2; f(a) are equivalent calls—while in call by reference one can think of the argument as a variable in the calling context. Simply put what is passed "to" a method is referred to as an "argument". The "type" of data that a method can receive is referred to as a "parameter". In the present embodiment optimizing module 118B determined that the callee receiver is callers first argument. This determination is based on the word "arg" within the code 308.

At 210 and 212, optimizing module 118B may retrieve the class object and generate the redirected call. In object-oriented programming, a class is an extensible program-code-template for creating objects, providing initial values for state and implementations of behavior. Generating a redirected call may involve generating code to call the method using a slow indirect dispatch, for example in one embodiment generating a redirected call may involve loading the class from the object and then calling the method based on the class of the object. This is a more expensive call sequence than other (direct) calls that call the method's address directly. Loading (aka retrieving) the class from an object may involve generating a load instruction to read the field in the object point at the class of the object, i.e. it is simply reading the class field. Optimizing module 118B may also send class 304 to a deserializer to be deserialized.

In the present embodiment the generation of the redirected call is as follows:

```
class C {
void readObject(ObjectInputStream arg) {
. . .
int a=arg.readInt( )
x=SerializationSystem.redirectedReadObject(arg,
   C.class);
. . .
}
}
```

It is important to note that within method 200, if any of the step fails, present disclosure may proceed with the old method (as shown below as an example of a normal call) itself as depicted by step 214. This simply means that the original code for class 304 may be used instead of any manipulations.

```
class C {
void readObject(ObjectInputStream arg) {
. . .
int a=arg.readInt( )
x=arg.readObject( )
. . .
}
}
```

Referring again to FIG. 3, an example of a code flowing through method 200 is depicted. It must be mentioned that the following is necessary to be read in conjunction of pertinent information from FIG. 2.

With the present disclosure in place, when code flow enters a custom deserialization code (the readObject( ) method in class 302) and a call to deserialize its member objects is made (code 310), class loader program 108 using a compiler such as class loader program 108 using a compiler such as class loader program 108 using a compiler such as JIT compiler may understand the context of the method call and pass the class object for class 302 to an ORB defined method. The special context that the class loader program 108 using a compiler such as JIT compiler tries to look for is a method call to readObject is that it may be inside a method with signature: void readObject(java.io.ObjectInputStream s) in a class that is loaded by a user defined class loader. In another embodiment, it may be possible to check for both the above signature and the class loader of the class containing the readObject call at JIT compilation time, and so the class loader program 108 using a compiler such as JIT compiler can do the transformation if the checks permit. The transformation done by the class loader program 108 using a compiler such as JIT compiler will be to transform the readObject call to call a static redirectedReadObject method provided by ORB that takes in all of the original arguments and also an extra argument for the class of the method containing the call (e.g. class 302). The implantation of the redirectedReadObject method is shown below and essentially avoids the expensive stack walk by reading the class loader out of the class passed in (via the extra argument) and then caching the data. In computing, a stack trace (also called stack backtrace or stacktraceback) is a report of the active stack frames at a certain point in time during the execution of a program. When a program is run, memory is often dynamically allocated in two places; the stack and the heap. It must also be appreciated that a user may be given an option and choose whether to use an embodiment of the present disclosure or the system default already in place or another class optimizing method.

Figure 4:
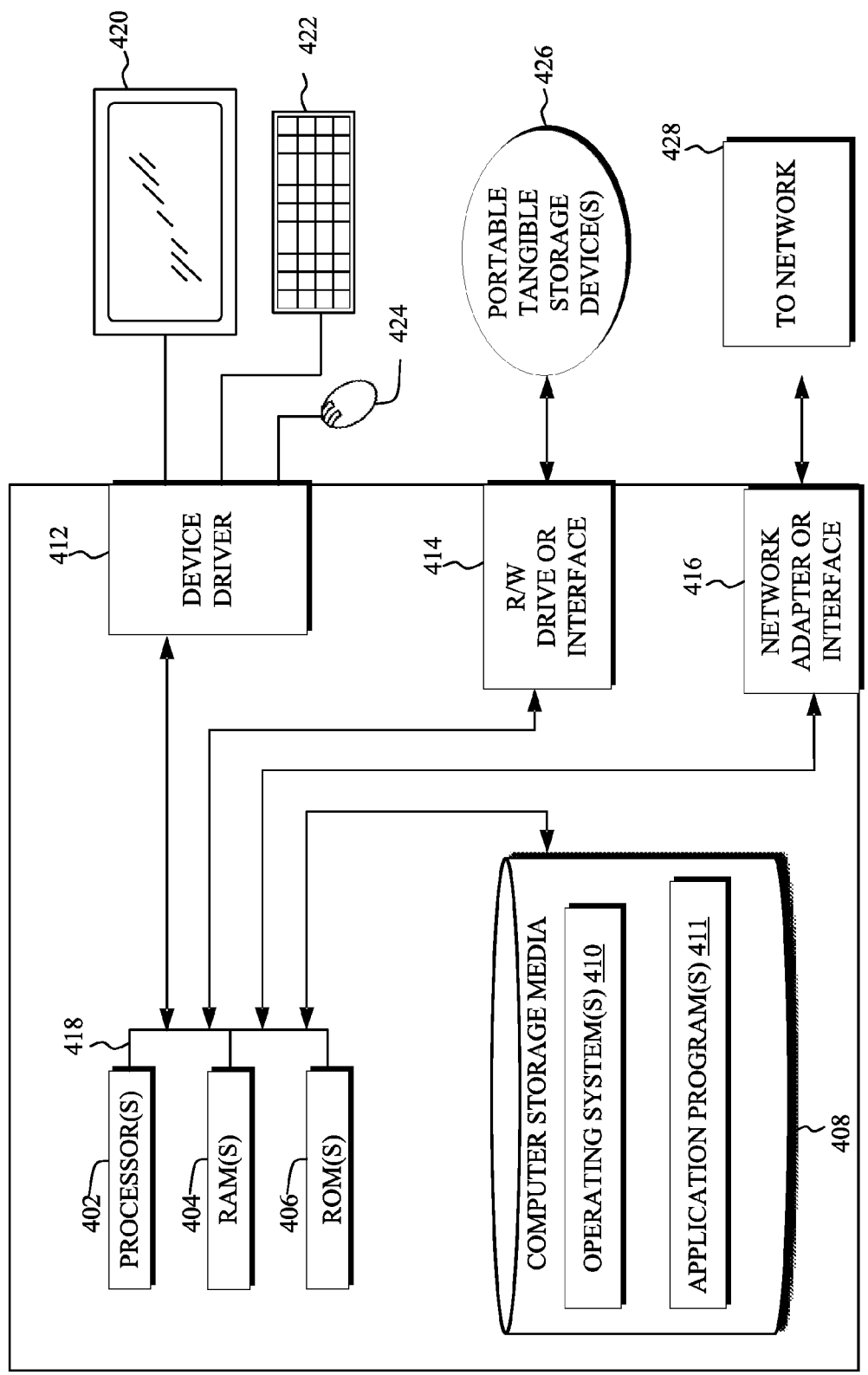
FIG. 4 is a block diagram of internal and external components of computers and servers depicted in FIG. 1, according an embodiment of the present disclosure.

Referring now to FIG. 4 components of a computer system, for example server 112 and data source 120, of computing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network generally network 428) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

While the present disclosure is particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

The invention claimed is:

1. A computer-implemented method for class load optimizing, comprising:
    identifying a class in which a context can be determined at a compile time, using a compiler;
    determining whether a caller method within the class has a specific signature call using the context of the class;
    determining a callee method within the class using the context of the class;
    determining whether the callee method's receiver is a first argument of the caller method;
    determining whether the callee method is the same as the caller method; and
    retrieving a class object of the class and generating the callee method to a second method, in response to the caller method having the specific signature, the callee method being of the specific signature, callee method being the first argument of the caller method, and the callee method being the same as the caller method, wherein generating refers to generating code to call the callee method.

2. The method of claim 1, wherein the determining whether the caller method within the class has the specific signature call further comprises determining whether the caller method gets passed in a first argument of a class type ObjectInputStream.

3. The method of claim 1, wherein the determining a callee method within the class using the context of the class, further comprises determining whether callee method has an overriding method of deserialization method in Java Application Programming Interface (API), ObjectInputStream.readObject( ).

4. The method of claim 1, wherein the method of claim 1 is not specific to Object Request Broker (ORB) and implemented by a traditional JAVA serialization.

5. The method of claim 4, wherein the traditional JAVA serialization comprises one or more of Java Remote Method Protocol (JRMP), or other protocol involving loading the class using Latest User Defined Class Loader (LUDCL).

6. The method of claim 1, wherein the retrieving the class object is performed at compile time.

7. The method of claim 1, wherein the determining the context of a class refers to determining the method of the class.

8. The method of claim 1, wherein the specific signature is void readObject.

9. The method of claim 1, wherein determining a callee method within the class is determining whether the callee method is readObject.

10. The method of claim 1, wherein the second method is a second class object is passed as an argument.

11. The method of claim 1, wherein the second method is a static method call of redirectedReadObject( ).

12. A computer program product for class load optimizing, the computer program product comprising:
one or more computer-readable storage media and program instructions stored on the one or more computer-readable storage media, the program instructions comprising:
identifying a class in which a context can be determined at a compile time, using a compiler;
instructions to determine whether a caller method within the class has a specific signature call using the context of the class;
instructions to determine a callee method within the class using the context of the class;
instructions to determine whether the callee method's receiver is a first argument of the caller method;
instructions to determine whether the callee method is the same as the caller method; and
instruction to retrieve a class object of the class and instructions to convert the callee method to a second method, in response to the caller method having the specific signature, the callee method being of the specific signature and callee method being the first argument of the caller method, and the callee method being the same as the caller method, wherein generating refers to generating code to call the callee method.

13. A computer system for class load optimizing, the computer system comprising:

one or more computer processors;
one or more computer-readable storage media;
program instructions stored on the computer-readable storage media for execution by at least one of the one or more processors, the program instructions comprising:
identifying a class in which a context can be determined at a compile time, using a compiler;
determining whether a caller method within the class has a specific signature call using the context of the class;
determining a callee method within the class using the context of the class;
determining whether the callee method's receiver is a first argument of the caller method;
determining whether the callee method is the same as the caller method; and
retrieving a class object of the class and converting the callee method to a second method, in response to the caller method having the specific signature, the callee method being of the specific signature and callee method being the first argument of the caller method, and the callee method being the same as the caller method, wherein generating refers to generating code to call the callee method.

14. The A computer system of claim 13, wherein the determining whether the caller method within the class has the specific signature call further comprises determining whether the caller method gets passed in a first argument of a class type ObjectInputStream.

15. The A computer system of claim 13, wherein the determining a callee method within the class using the context of the class, further comprises determining whether callee method has an overriding method of deserialization method in Java Application Programming Interface (API), ObjectInputStream.readObject( ).

16. The A computer system of claim 13, wherein the computer system of claim 13 is not specific to Object Request Broker (ORB) and implemented by a traditional JAVA serialization.

17. The computer system of claim 13, wherein the second method is a second class object is passed as an argument.

18. The A computer system of claim 13, wherein the retrieving the class object is performed at compile time.

19. The computer system of claim 13, wherein the specific signature is void readObject.

20. The computer system of claim 13, wherein determining a callee method within the class is determining whether the callee method is readObject.

* * * * *